(12) United States Patent
Daigger et al.

(10) Patent No.: US 6,946,073 B2
(45) Date of Patent: Sep. 20, 2005

(54) METHOD FOR TREATING WASTEWATER IN A MEMBRANE BIOREACTOR TO PRODUCE A LOW PHOSPHORUS EFFLUENT

(75) Inventors: Glen T. Daigger, Parker, CO (US); Edwin J. Fleischer, Ashburn, VA (US); Albert M. Wollmann, Gainesville, VA (US)

(73) Assignee: CH2M Hill, Inc., Englewood, CO (US)

( * ) Notice: Subject to any disclaimer, the term of this patent is extended or adjusted under 35 U.S.C. 154(b) by 0 days.

(21) Appl. No.: 10/654,186

(22) Filed: Sep. 2, 2003

(65) Prior Publication Data

US 2005/0045557 A1 Mar. 3, 2005

(51) Int. Cl.$^7$ .................................................. C02F 3/30
(52) U.S. Cl. ...................... 210/605; 210/623; 210/631; 210/906; 210/195.2; 210/198.1; 210/259
(58) Field of Search ................................. 210/605, 620, 210/621, 623, 631, 906, 195.2, 252, 198.1, 259

(56) References Cited

U.S. PATENT DOCUMENTS

| | | | |
|---|---|---|---|
| 4,008,161 A | | 2/1977 | Wong |
| 4,237,002 A | | 12/1980 | Strudgeon |
| 4,315,821 A | * | 2/1982 | Climenhage ................ 210/605 |
| 4,623,464 A | | 11/1986 | Ying |

(Continued)

FOREIGN PATENT DOCUMENTS

| | | | |
|---|---|---|---|
| CA | 2314383 | * | 1/2002 |
| JP | 60-38095 | * | 2/1985 |
| JP | 4-215892 | * | 8/1992 |
| JP | 11-262795 | * | 9/1999 |
| JP | 2000-167555 A | | 6/2000 |

OTHER PUBLICATIONS

Paper presented at AWWA Annual Conference & Exhibition, Dallas, Texas, Jun. 21–25, 1998, Lebeau et al., "Application of Immersed Membrane Microfiltration for NOM Removal".

English translation of JP 04215892, "Sewage purifying Tank", Aug. 1992.

*Primary Examiner*—Fred G. Prince
(74) *Attorney, Agent, or Firm*—Swanson & Bratschun LLC

(57) ABSTRACT

Removal of biological nutrients from a wastewater yielding a low phosphorous (e.g., less than 0.25 mg/L) output includes providing a serial multistage bioreactor containing activated sludge having in hydraulic series an anaerobic zone and a downstream aerobic zone, with each zone having an upstream inlet and a downstream outlet. The wastewater is provided to the anaerobic zone inlet. A quantity of chemical sufficient to precipitate soluble and particulate phosphorous is added to the downstream aerobic zone in an amount sufficient to yield a low phosphorous output. Treated water is separated from the activated sludge and precipitated phosphorous and a return activated sludge separated from the treated water is recycled to the anaerobic zone.

15 Claims, 2 Drawing Sheets

U.S. PATENT DOCUMENTS

| | | | |
|---|---|---|---|
| 4,787,978 | A | 11/1988 | Nicol |
| 4,867,883 | A | 9/1989 | Daigger et al. |
| 4,882,058 | A | 11/1989 | Burton |
| 4,904,387 | A | 2/1990 | Jordan |
| 4,961,854 | A | 10/1990 | Wittmann |
| 5,240,611 | A | 8/1993 | Burton |
| 5,258,121 | A | 11/1993 | Jordan |
| 5,290,451 | A * | 3/1994 | Koster et al. ............... 210/605 |
| 5,342,522 | A | 8/1994 | Marsman |
| 5,354,471 | A | 10/1994 | Timpany |
| 5,364,534 | A | 11/1994 | Anselme et al. |
| 5,443,845 | A | 8/1995 | Felix |
| 5,480,548 | A | 1/1996 | Daigger |
| 5,514,278 | A | 5/1996 | Khudenko |
| 5,601,719 | A | 2/1997 | Hawkins |
| 5,603,833 | A | 2/1997 | Miller |
| 5,643,453 | A * | 7/1997 | Pannier et al. .............. 210/605 |
| 5,650,069 | A | 7/1997 | Hong |
| 5,651,889 | A | 7/1997 | Wataya |
| 5,651,891 | A | 7/1997 | Molof |
| 5,651,892 | A | 7/1997 | Pollock |
| 5,725,885 | A | 3/1998 | Felix |
| 5,733,455 | A | 3/1998 | Molof |
| 5,783,083 | A | 7/1998 | Henshaw et al. |
| 5,792,355 | A * | 8/1998 | Desjardins .................. 210/605 |
| 5,798,044 | A | 8/1998 | Strohmeier |
| 5,853,588 | A | 12/1998 | Molof |
| 5,942,108 | A | 8/1999 | Yang |
| 6,007,712 | A | 12/1999 | Tanaka et al. |
| 6,027,649 | A | 2/2000 | Benedek |
| 6,077,430 | A * | 6/2000 | Chudoba et al. ............ 210/605 |
| 6,406,628 | B1 | 6/2002 | Chang |
| 6,406,629 | B1 | 6/2002 | Husain |
| 6,485,645 | B1 | 11/2002 | Husain |
| 6,517,723 | B1 | 2/2003 | Daigger |
| 6,551,815 | B1 | 4/2003 | Nuttall |
| 2002/0162795 | A1 | 11/2002 | Pollock |
| 2003/0217968 | A1 * | 11/2003 | Goel et al. .................. 210/605 |

* cited by examiner

METHOD FOR TREATING WASTEWATER IN A MEMBRANE BIOREACTOR TO PRODUCE A LOW PHOSPHORUS EFFLUENT

TECHNICAL FIELD

The present invention is directed toward wastewater treatment processes, and more particularly toward an activated sludge treatment process using a membrane bioreactor ("MBR") and using biological and chemical phosphorus removal adapted to prevent phosphorus limiting conditions in the activated sludge treatment process.

BACKGROUND ART

Biological treatment processes for the removal of biological nutrients such as biological oxygen demand ("BOD"), nitrates and phosphates are well known. A typical biological treatment process is an activated sludge process in which the wastewater is aerated and agitated with an activated sludge and then purged of a variety of microorganisms. Often this aerobic stage is combined with an anaerobic stage, i.e., a stage operated in the absence of induced oxygen, either soluble or derived from nitrites or nitrates ($NO_x$) and an anoxic stage, i.e., where oxygen is absent but nitrites or nitrates are present. Phosphorus removal is accomplished by the presence of phosphorus-accumulating organisms ("PAOs") in the anaerobic stage which release phosphorus into the wastewater as part of the process of accumulating organic matter (i.e., volatile fatty acids) used for cell growth. In a downstream aerobic or anoxic zone, the organisms metabolize the accumulated organic matter and accumulate the released phosphorus into cells as part of the growth process. A number of prior art patents disclose multi-zoned bioreactors with some recycling of flows between the various zones to maintain concentrations of useful microorganisms and to improve biological nutrient removal. For example, Daigger, U.S. Pat. No. 6,517,723, the contents of which are incorporated herein by reference. Other examples include Daigger, U.S. Pat. No. 5,480,548; Hawkins, U.S. Pat. No. 5,601,719; Marsman, U.S. Pat. No. 5,342,522; Strohmeier, U.S. Pat. No. 5,798,044; Hong, U.S. Pat. No. 5,650,069; Timpany, U.S. Pat. No. 5,354,471; Wittmann, U.S. Pat. No. 4,961,854; Nicol, U.S. Pat. No. 4,787,978; and Yang, U.S. Pat. No. 5,942,108.

In certain circumstances, very low concentrations of phosphates in effluents are required and in such circumstances chemical precipitation is used for phosphate or phosphorous removal. In chemical precipitation methods, soluble salts, such as ferrous/ferric chloride or aluminum sulfate, are added to the wastewater to form insoluble phosphate metal salts. The insoluble phosphate metal salts are then gravity separated or filtered from the wastewater to yield an effluent with low concentrations of total phosphate ("TP"). Low levels of TP are defined herein to be in a range of less than 0.25 mg/L.

As disclosed in Husain, U.S. Pat. No. 6,406,629, a type of biological treatment known as a membrane bioreactor can be combined with phosphate precipitation techniques. Husain sets forth an example of addition of phosphate precipitating chemicals to an aerobic tank connected to a membrane filter. This combination is criticized, however, because the presence of metallic precipitates increases the rate of membrane fouling or forces the operator to operate the system at an inefficient long sludge retention time. Another disadvantage of a combined system as described is if the system includes recycle of activated sludge, which is typical in biological processes, removal of phosphorous in excess of the stoichoimetric amount of phosphorous required to support growth of the activated sludge in the biological treatment process can degrade the efficiently of the biological treatment process' removal of other nutrients.

Husain describes one attempted solution to the problems discussed above. Husain provides side stream processes operating in parallel to a conventional multistage activated sludge biological treatment process to remove excess phosphorous. In a first side stream process, a liquid lean in solids but containing phosphates is extracted from anaerobic mixed liquor from an anaerobic stage of the activated sludge process. Phosphates are precipitated from that mixed liquor to produce a phosphorus lean liquid which leaves the process as effluent or is returned to an anoxic or aerobic zone. In an alternate side stream process, an aerobic mixed liquor is removed to a reaction zone and treated to form a liquid rich in insoluble phosphates. The liquid rich in insoluble phosphates is treated in a hydro cyclone to separate out insoluble phosphates and create a liquid lean in insoluble phosphates. The liquid lean in insoluble phosphates is returned to the anoxic zone. While the solution proposed in Husain may provide for effective phosphorous removal, it requires additional processes which increase treatment costs along with the space required to perform the treatment process. In addition, the first side stream process may result in a phosphorous deficiency in biological process stages downstream from the anaerobic zone.

The present invention is directed toward overcoming one or more of the problems discussed above.

SUMMARY OF THE INVENTION

An aspect of the present invention is a method for removal of biological nutrients from a wastewater yielding a low phosphorous (e.g., less than 0.25 mg/L) output. A serial multistage bioreactor containing activated sludge having in hydraulic series an anaerobic zone and a downstream aerobic zone, each zone having an upstream inlet and a downstream outlet is provided. A wastewater is provided to the anaerobic zone inlet. A quantity of chemical sufficient to precipitate soluble and particulate phosphorous is added to the downstream aerobic zone in an amount sufficient to yield a low phosphorous output. Treated water is separated from the activated sludge and precipitated phosphorous and a return activated sludge separated from the treated water is recycled to the anaerobic zone.

In a preferred embodiment, the separating of the treated water from the activated sludge and precipitated phosphorous is performed by filtering the treated water, activated sludge and precipitated phosphorous through an immersed membrane filter operatively associated with the downstream aerobic zone. The multistage bioreactor may further include an anoxic zone in hydraulic series intermediate the anaerobic and downstream aerobic zone. Alternatively the multistage bioreactor may include an upstream anoxic zone, and upstream aerobic zone and a downstream anoxic zone in hydraulic series between the anaerobic zone and the downstream aerobic zone. A variety of recycling options are available. For example, the return activated sludge may first be recycled to near an inlet of the anoxic zone and then recycled from near an outlet of the anoxic zone to the anaerobic zone. Alternatively, the return activated sludge may be first recycled to near an inlet of the upstream aerobic zone and then recycled from near the outlet of the upstream aerobic zone to near then inlet of the upstream anoxic zone and then recycled from near the outlet of the upstream anoxic zone to the anaerobic zone.

The method of the present invention allows for obtaining low phosphorous output by a combined biological treatment process and chemical phosphorous removal. Surprisingly, recycle of return activated sludge including residuals of the phosphorous precipitating chemical does not cause sufficient precipitation of released phosphorous to inhibit the downstream biological processes. The anaerobic zone in essence functions as a phosphorous buffer to assure a supply of phosphorous for downstream biological processes during simultaneous chemical removal of phosphorous in the downstream aerobic zone. Thus, the method allows for chemical phosphorous removal within a conventional biological treatment process including an anaerobic zone without inhibiting and still promoting robust nutrient uptake in the downstream biological zones. In addition to easing the need to provide precise amounts of phosphorous removal agents in the downstream aerobic zone, the method eliminates the need for side stream phosphorous removal processes or subsequent downstream phosphorous removal and clarification, thus minimizing space requirements and attendant cost.

DETAILED DESCRIPTION OF THE PREFERRED EMBODIMENT

Figure 1:
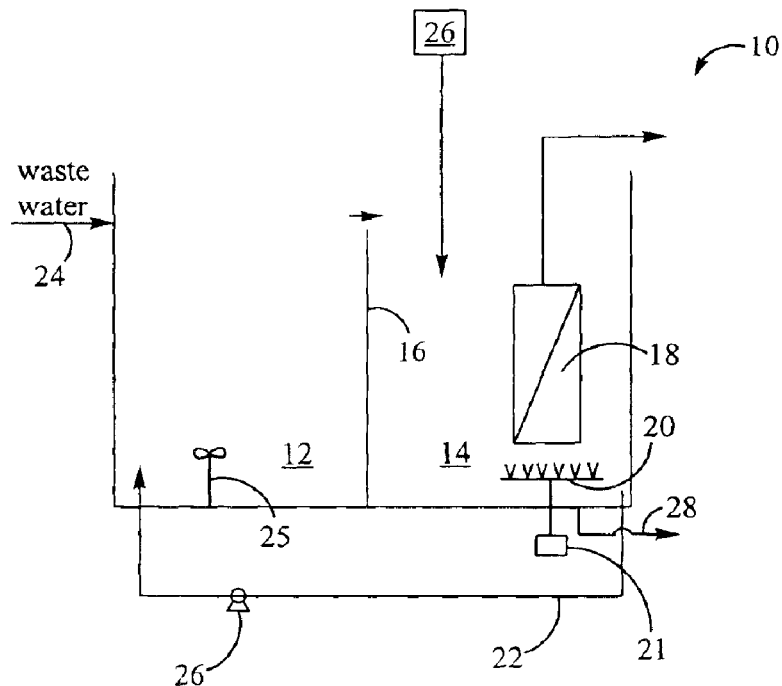
FIG. 1 is a schematic representation of a first embodiment of an apparatus for treating wastewater in accordance with the present invention having an anaerobic and an aerobic treatment zone.

A first embodiment of a membrane bioreactor apparatus 10 for the treatment of wastewater to produce a low phosphorous effluent is illustrated in FIG. 1. The apparatus 10 consists of a multistage bioreactor having in hydraulic series an anaerobic zone 12 and an aerobic zone 14 divided by a weir 16. Those skilled in the art will appreciate that separate vessels connected by conduits could be employed as an alternative to the two zones separated by the weir 16. A membrane filter 18 is operatively associated with the downstream aerobic zone 14. In a preferred embodiment as illustrated in FIG. 1, the membrane filter 18 is immersed in the aerobic zone 14. Alternatively, the membrane filter could be in a downstream zone. The aerobic zone 14 is preferably provided with an aerator 20 in the form of a diffuser attached to air supply 21 situated below the membrane filter 18 which both provides air to the aerobic zone 14 and helps purge the membrane filter 18 of adhering solids. A recycle conduit 22 is provided with an inlet in the aerobic zone 14 and an outlet near an inlet 24 to the anaerobic zone 12 for recycling return activated sludge. A mixer 25 is preferably provided to maintain the mixed liquor suspended solids in suspension. A pump 26 may be provided for promoting the return activated sludge recirculation. A chemical supply 26 is provided in communication with the aerobic zone 14 for providing a chemical suitable for precipitating phosphates in the aerobic zone 14. Suitable chemicals for phosphate precipitation include soluble salts such as ferrous/ferric chloride or aluminum sulfate.

In use, wastewater is provided through the inlet 24 to the anaerobic zone 12. In the anaerobic zone 12, phosphorous-accumulating organisms release phosphorous into the wastewater as they accumulate fatty acids used for cell growth. In the aerobic zone 14, the phosphorous-accumulating organisms metabolize the accumulated organic matter and accumulate the released phosphorous into cells as part of the growth process. In this manner, phosphorous is removed from the effluent filtered through the membrane filter 18. In order to achieve low concentrations of phosphorous (e.g., less than 0.25 mg/L), the apparatus 14 provides for addition of soluble salts to the aerobic zone for forming insoluble phosphate metal salts from any residual phosphorous. These salts are added from the supply 26 as needed to achieve the low concentrations of phosphorous effluent results. Precipitated phosphorous and activated sludge are separated from the effluent by the membrane filter 18. Return activated sludge (which may include some insoluble phosphate metal salts and soluble phosphorous precipitating salts) is recycled through conduit 22 to the anaerobic zone 12. A quantity of waste activated sludge, including insoluble phosphate salts, is removed from the aerobic tank through conduit 28.

Use of the anaerobic zone 12 in combination with the aerobic zone 14 ensures that adequate phosphorous will be available in the aerobic zone 14 for the digestion of BOD, COD and other nutrients from the wastewater 24. While the phosphorous precipitating salts lower the phosphorous content in the aerobic zone 14, the anaerobic process in zone 12 acts as a phosphorous buffer by continuing to release phosphorous into the aerobic zone 14. The anaerobic zone 12 also functions as a buffer against insoluble salts which are recycled as part of the return activated sludge through conduit 22 to the anaerobic zone 12.

Figure 2:
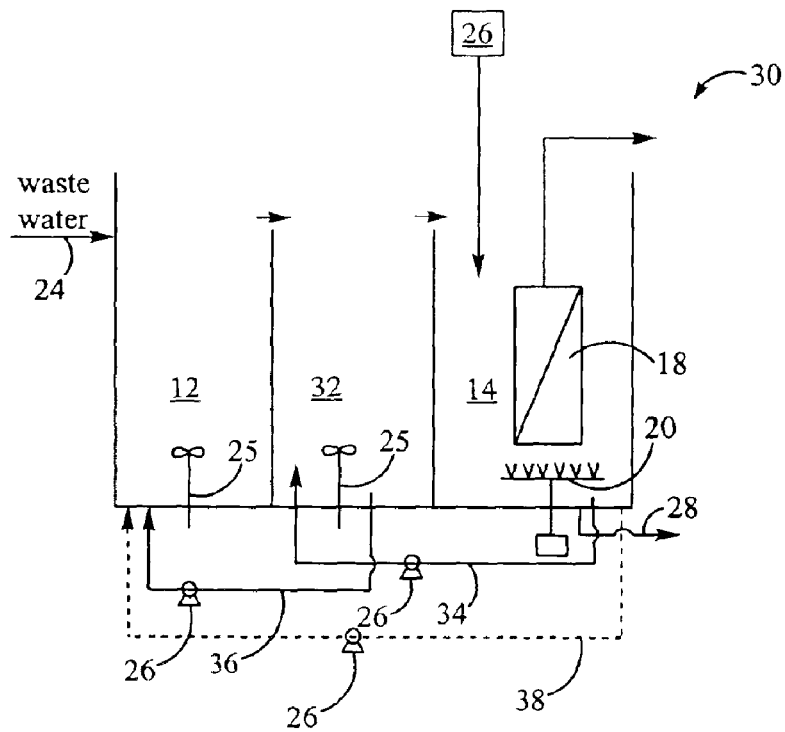
FIG. 2 is a schematic representation of a second embodiment of an apparatus for treating wastewater in accordance with the present invention having an anaerobic, anoxic and aerobic zone.

FIG. 2 is a second embodiment of a membrane bioreactor apparatus 30 producing a low phosphorous effluent. Like elements of FIG. 2 will have the same reference numbers used above in describing FIG. 1. The primary difference between the apparatus 30 of FIG. 2 and the apparatus 10 of FIG. 1 is the inclusion of an upstream anoxic zone 32 between the anaerobic zone 12 and the downstream aerobic zone 14. The anoxic zone 32 functions as a de-nitrification zone wherein nitrate/nitrite nitrogen in the effluent is converted to elemental nitrogen. There is substantially no dissolved oxygen present in the anoxic zone 32. The conversion of the $NO_x$ to elemental nitrogen occurs because the micro organisms in the anoxic zone 32 seek oxygen through the reduction of $NO_x$ compounds to nitrogen gas. The nitrogen gas is then able to escape the liquid phase to the atmosphere. A nitrogen rich recycle conduit ("NRCY") 34 recycles return activated sludge from the downstream aerobic zone 14 to near the inlet of the anoxic zone 32. An anoxic recycle conduit 36 recycles de-nitrified mixed liquor from near the outlet of the anoxic zone 32 to near the inlet of the anaerobic zone 12. Alternatively, as shown by a phantom line, a conduit 38 may be provided to recycle mixed liquor suspended solids directly from the aerobic zone 14 to near the inlet of the anaerobic zone 12. The embodiment illustrated in FIG. 2 performs the same phosphorous removal and phosphorous buffering functions as the embodiment in FIG. 1, but includes the upstream anoxic zone 32 for the promotion of de-nitrification.

Figure 3:
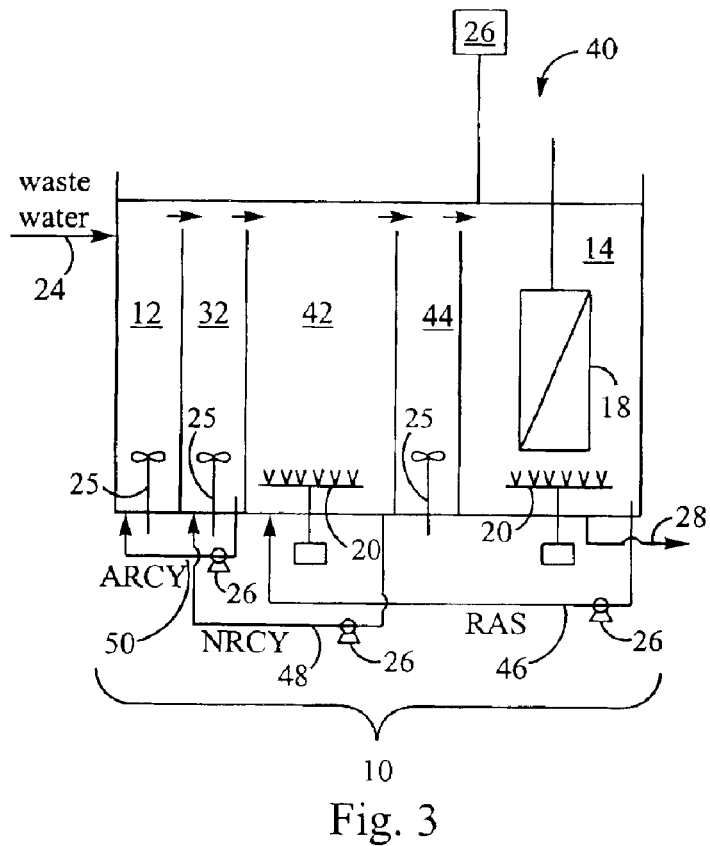
FIG. 3 is a schematic representation of a third embodiment of an apparatus for treating wastewater in accordance with the present invention having an anaerobic zone, an upstream anoxic zone, an upstream aerobic zone, a downstream anoxic zone and a downstream aerobic zone.

FIG. 3 is a third embodiment of a membrane bioreactor apparatus 40 for treating wastewater to produce a low phosphorous effluent. Identical reference numbers will be used for identical elements in the third embodiment 40 as used in the embodiments illustrated in FIGS. 1 and 2. The third embodiment 40 includes an upstream aerobic zone 42 and a downstream anoxic zone 44 between the upstream anoxic zone 32 and the downstream aerobic zone 40 of the apparatus 30 illustrated in FIG. 2. The upstream aerobic zone 42 and downstream anoxic zone 44 are provided for enhanced nutrient removal. The third embodiment 40 includes a conduit 46 for recycling return activated sludge from the downstream aerobic zone 14 to near the inlet of the upstream aerobic zone 44. A NRCY conduit 48 recycles NRCY from near the outlet of the upstream anaerobic zone 42 to near then inlet of the upstream anoxic zone 32. Finally, an ARCY conduit 50 recycles activated sludge from near the outlet of the upstream anoxic zone 32 to near then inlet of the anaerobic zone 12.

Figure 4:
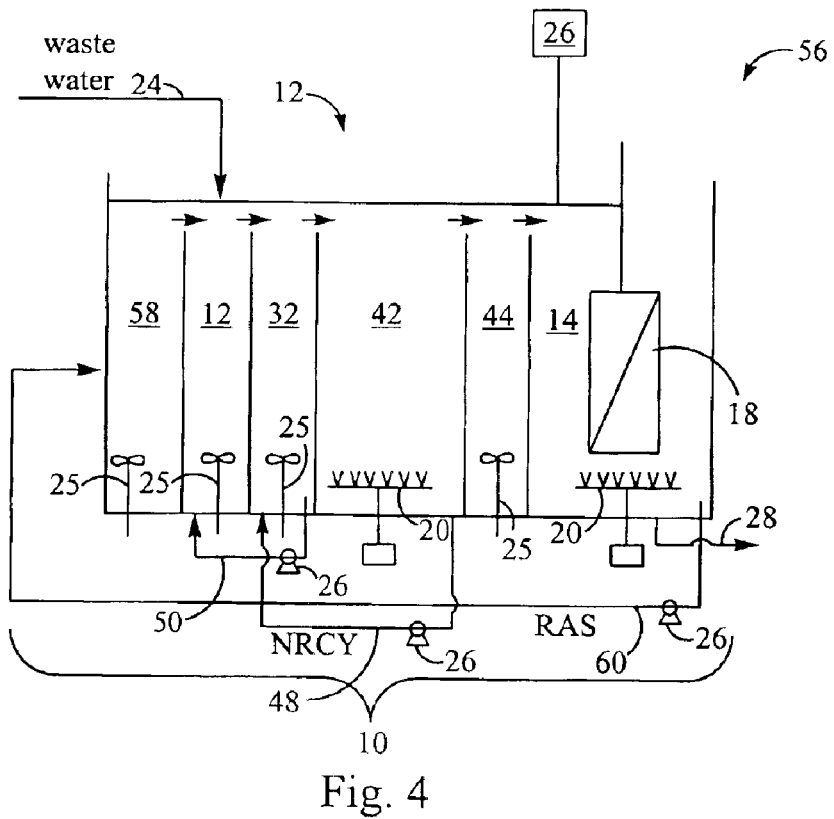
FIG. 4 is a schematic representation of an alternate embodiment of the apparatus of FIG. 3.

FIG. 4 illustrates a fourth embodiment of a membrane bioreactor apparatus 56 for treating wastewater to produce a low phosphorous effluent. This embodiment is similar to the third embodiment 40 illustrated in FIG. 3 and again identical reference are used for identical elements. The principal difference between the third embodiment 40 and the fourth embodiment 56 is provision of a de-aeration zone 58 upstream of the anaerobic zone 12 and a RAS recycle conduit 60 recycling return activated sludge from the aerobic zone 14 to the de-aeration zone 58. Alternatively, the anaerobic zone 12 could be made large and the RAS recycle conduit 60 could flow directly to the anaerobic zone 12.

EXAMPLE

A pilot testing program was conducted to test the nutrient removal capability of the third embodiment of the membrane bioreactor ("MBR") and method for treating wastewater described with reference to FIG. 3 above. The pilot testing program included a number of objectives. The overall objective of the program was to determine whether the MBR could achieve the effluent limitation goals shown in Table 1.

TABLE 1

Treatment Goals

| Parameter | Treatment Goals |
|---|---|
| Biochemical Oxygen Demand (BOD), mg/L | Not applicable (NA) |
| Total Suspended Solids (TSS), mg/L | 1 |
| Chemical Oxygen Demand (COD), mg/L | 10.0[a] |
| Total Nitrogen (TN), mg/L | 3.0–8.0 |
| Total Phosphorus (TP), mg/L | 0.1 |
| Turbidity (Nephelometric Turbidity Units, NTU) | 0.5 NTU |
| Coliform (per 100 mL) | <2/100 mL |

[a]COD limit to be achieved through the post-treatment of MBR effluent with activated carbon.

The wastewater used for the pilot testing program consisted of municipal sewage from a community. The wastewater sources were mostly domestic in nature (i.e., few industrial inputs). Table 2 summarizes the typical characteristics of the raw wastewater source and for the effluent from the primary treatment facility that was used as the input to the membrane bioreactor pilot.

TABLE 2

Typical Wastewater Characteristics

| Parameter | Raw Wastewater | Primary Effluent (Pilot Influent) |
|---|---|---|
| Biochemical Oxygen Demand (BOD), mg/L | 273 | 133 |
| Total Suspended Solids (TSS), mg/L | 211 | 82 |
| Chemical Oxygen Demand (COD), mg/L | Not Available | 283 |
| Total Kjeldahl Nitrogen (TKN), mg/L | 28 | 36 |
| Ammonia ($NH_3$—N), mg/L | 22 | 21 |
| Total Phosphorus (TP), mg/L | 6 | 5.5 |
| BOD/TKN Ratio | 10.2 | 3.8 |

With regard to phosphorus removal, the pilot testing equipment was operated in the configuration shown in FIG. 3 of the application for 112 days. To maximize nitrogen removal, the system was operated with methanol addition (a supplemental carbon source) during the entire period. The methanol dose averaged about 52 mg/L during the testing period.

Alum was not added during days 1–51 to determine the base amount of phosphorus that could be removed by biological activity alone. Alum was added during days 52–112 to maximize the amount of phosphorus removal within the reactor and to verify that the process could achieve an effluent concentration of 0.1 mg/L for total phosphorus (TP). The alum dose varied between 23 and 73 mg/L, and the average alum dose was 43 mg/L.

Table 3 summarizes the results from the pilot testing program for the periods described above. Included on Table 3 are the average, maximum, and minimum values for effluent total nitrogen, total phosphorus, and chemical oxygen demand (COD), another important indicator of treatment efficacy, for the membrane bioreactor portion of the pilot. COD was measured in place of biochemical oxygen demand (BOD), which was removed to near the detection limit.

To simplify the presentation, the pilot data is shown for the entire operating period and includes variations in chemical doses, recycle flow rates, etc. (not shown) that result in subsequent treatment variations. In terms of phosphorus removal, the data clearly shows that low levels of effluent phosphorus can be achieved. Overall, the pilot equipment was able to meet all of the goals listed in Table 1. Post-treatment of the MBR effluent with activated carbon was needed to meet the effluent COD requirement of 10 mg/L.

Without alum addition, the effluent TP averaged 2.76 mg/L with a minimum value of 1.88 mg/L. These values are lower than conventional plants (typically about 4 mg/L) without biological or chemical phosphorus removal capabilities.

With alum addition, the effluent TP averaged 0.24 mg/L with a minimum value of 0.02 mg/L. The operating period included several days during which effluent TP was less than the 0.1 mg/L treatment goal listed on Table 1. The treatment goals for BOD, TSS, COD, TN, TP, turbidity and coliform were achieved during the several days of extremely low TP (less than 0.1 mg/L).

TABLE 3

Effluent Data from the Pilot Testing Program

| Time Period | | Effluent Total Nitrogen (TN) (mg/L) | Effluent Total Phosphorus (TP) (mg/L) | Effluent Chemical Oxygen Demand (COD) (mg/L) |
|---|---|---|---|---|
| 5-Stage Operation with Methanol Addition (without Alum Addition) | | | | |
| Days 1–51 | Average | 9.1 | 2.76 | 18.7 |
| | Maximum | 24.6 | 3.94 | 38.1 |
| | Minimum | 0.8 | 1.88 | 10.0 |
| 5-Stage Operation with Methanol and Alum Addition | | | | |
| Days 52–112 | Average | 3.59 | 0.24 | 14.6 |
| | Maximum | 13.5 | 1.73 | 18.2 |
| | Minimum | 1.0 | 0.02 | 11.6 |

What is claimed is:

1. A method for removal of biological nutrients from a wastewater yielding a low phosphorous output comprising:
   a) providing a serial multistage bioreactor containing activated sludge comprising in hydraulic series an anaerobic zone, an upstream aerobic zone, a downstream aerobic zone and an immersed membrane filter operatively associated with the downstream aerobic zone, each zone having an upstream inlet and a downstream outlet;
   b) providing a wastewater to the anaerobic zone inlet;
   c) adding a quantity of chemical to precipitate soluble and particulate phosphorous in an amount sufficient to yield a low phosphorous output downstream of the upstream aerobic zone and upstream of the immersed membrane filter;
   d) separating treated water from the activated sludge and precipitated phosphorous by the immersed membrane filter; and
   e) recycling return activated sludge separated by the immersed membrane filter from treated water to the anaerobic zone.

2. The method of claim 1 wherein step a) further comprises providing an upstream anoxic zone in hydraulic series intermediate the anaerobic zone and the upstream aerobic zone.

3. The method of claim 2 wherein step a) further comprises providing a multistage bioreactor having a downstream anoxic zone in hydraulic series intermediate the upstream and downstream aerobic zones and step c) further comprises adding the quantity of chemical downstream of the downstream anoxic zone.

4. The method of claim 3 further comprising in step c) adding the quantity of chemical to the downstream aerobic zone.

5. The method of claim 2 further comprising in step e) the return activated sludge is first recycled to near an inlet of the upstream aerobic zone and then recycled from near the outlet of the upstream aerobic zone to near the inlet of the upstream anoxic zone and from near the outlet of the upstream anoxic zone to the anaerobic zone.

6. The method of claim 2 further comprising in step e) recycling return activated sludge from near the upstream aerobic zone outlet to near the upstream anoxic zone inlet and recycling return activated sludge from near the upstream anoxic zone outlet to near the anaerobic zone inlet.

7. The method of claim 1 wherein in step c) the low phosphorous output is less than 0.25 mg/L.

8. The method of claim 1 wherein in step c) the low phosphorous output is less than 0.1 mg/L.

9. The method of claim 1 further comprising in step c) adding the quantity of chemical to the downstream aerobic zone.

10. The method of claim 1 wherein the immersed membrane filter is in the downstream aerobic zone.

11. An apparatus for removal of biological nutrients from a wastewater comprising:
    a serial multistage reactor configured to contain activated sludge comprising in hydraulic series an anaerobic zone, an upstream aerobic zone and a downstream aerobic zone, each zone having an upstream inlet and a downstream outlet;
    an immersed membrane filter operatively associated with the downstream aerobic zone; and
    means for adding a quantity of chemical to precipitate soluble and particulate phosphorus downstream of the upstream aerobic zone and upstream of the immersed membrane filter.

12. The apparatus of claim 11, further comprising an upstream anoxic zone in hydraulic series intermediate the anaerobic zone and the upstream aerobic zone.

13. The apparatus of claim 12 further comprising a downstream anoxic zone in hydraulic series intermediate the upstream and downstream aerobic zones and the chemical adding means is configured to add the quantity of chemical downstream of the downstream anoxic zone.

14. The apparatus of claim 11 further comprising the chemical adding means being configured to add chemical to the downstream aerobic zone.

15. The apparatus of claim 11 wherein the immersed membrane filter is in the downstream anaerobic zone.

* * * * *